(12) United States Patent
Chuang et al.

(10) Patent No.: US 9,419,259 B2
(45) Date of Patent: *Aug. 16, 2016

(54) HIGH THERMAL CONDUCTIVITY BATTERY ASSEMBLY

(75) Inventors: Chia-Ming Chuang, Taipei (TW); David YuanJei Tse, Taipei (TW)

(73) Assignee: Atieva, Inc., Redwood City, CA (US)

( * ) Notice: Subject to any disclaimer, the term of this patent is extended or adjusted under 35 U.S.C. 154(b) by 714 days.

This patent is subject to a terminal disclaimer.

(21) Appl. No.: 13/452,908

(22) Filed: Apr. 22, 2012

(65) Prior Publication Data

US 2013/0136955 A1  May 30, 2013

Related U.S. Application Data

(63) Continuation-in-part of application No. 13/371,426, filed on Feb. 11, 2012.

(30) Foreign Application Priority Data

Nov. 30, 2011 (CN) .......................... 2011 1 0389264

(51) Int. Cl.
| | | |
|---|---|---|
| H01M 10/02 | (2006.01) | |
| H01M 10/50 | (2006.01) | |
| H01M 4/64 | (2006.01) | |
| H01M 2/06 | (2006.01) | |
| H01M 2/20 | (2006.01) | |
| H01M 2/10 | (2006.01) | |
| H01M 10/654 | (2014.01) | |
| H01M 10/643 | (2014.01) | |
| H01M 10/613 | (2014.01) | |
| H01M 10/659 | (2014.01) | |

(52) U.S. Cl.
CPC .............. *H01M 2/105* (2013.01); *H01M 2/204* (2013.01); *H01M 10/613* (2015.04); *H01M 10/643* (2015.04); *H01M 10/654* (2015.04); *H01M 10/659* (2015.04)

(58) Field of Classification Search
USPC ....................... 429/50–52, 96–100, 149–160, 429/163–187, 123, 161
See application file for complete search history.

(56) References Cited

U.S. PATENT DOCUMENTS

| | | | | |
|---|---|---|---|---|
| 5,340,672 | A * | 8/1994 | Kubota et al. ................. | 429/249 |
| 6,051,336 | A * | 4/2000 | Dougherty et al. ........... | 429/149 |
| 6,377,432 | B1 * | 4/2002 | Hashimoto .................... | 361/104 |
| 6,811,921 | B2 * | 11/2004 | Dansui et al. .................. | 429/99 |
| 7,316,863 | B2 * | 1/2008 | Sato .............................. | 429/158 |
| 2002/0098410 | A1 * | 7/2002 | Leysieffer et al. ............. | 429/61 |
| 2004/0241541 | A1 * | 12/2004 | Watanabe et al. ............. | 429/163 |

(Continued)

*Primary Examiner* — Basia Ridley
*Assistant Examiner* — Caitlin Wilmot
(74) *Attorney, Agent, or Firm* — Womble Carlyle Sandridge & Rice, LLP

(57) ABSTRACT

The invention relates to a battery assembly with high thermal conductivity. The battery assembly comprises a metal case having a hollow accommodation cavity formed therein, a plurality of battery cells installed parallel to one another within the metal case, and a common electrode for connection to the other electrode in each of the battery cells. Each of the battery cells has two electrodes, with one of the electrodes that corresponds to those of the rest of the battery cells being connected in a thermally conductive manner to the metal case. The invention takes advantage of high thermal conductivity of metallic material and dissipates heat by connecting the metal case to the battery electrodes. The invention further comprises fixation troughs formed on the metal case, thereby reducing the size of the assembly.

17 Claims, 13 Drawing Sheets

(56) References Cited

U.S. PATENT DOCUMENTS

| | | | |
|---|---|---|---|
| 2005/0089750 A1* | 4/2005 | Ng et al. | 429/120 |
| 2009/0208820 A1* | 8/2009 | Nishino et al. | 429/56 |
| 2010/0028758 A1* | 2/2010 | Eaves et al. | 429/50 |
| 2010/0151308 A1* | 6/2010 | Hermann et al. | 429/120 |

* cited by examiner

HIGH THERMAL CONDUCTIVITY BATTERY ASSEMBLY

CROSS-REFERENCE TO RELATED APPLICATIONS

This application is a continuation-in-part of application Ser. No. 13/371,426, filed on Feb. 11, 2012, the contents of which are incorporated by reference.

BACKGROUND OF THE INVENTION

1. Field of the Invention

The present invention relates to a high thermal conductivity battery assembly; in particular, it is suitable to serve as building block for drive train battery system for electric vehicles, solar energy storage, and grid storage applications.

2. Description of Related Art

The invention of high energy density battery technologies initiated the market of cellular phones, notebook computers, electric cars, and grid storage applications. The market demand for smaller form factor and longer operating hours pushing the battery makers to invent higher and higher energy density battery cells. Higher energy density cells require more chemically active materials and inherently less stable and more difficult to design battery systems with high safety factor.

Most high energy density battery cells are consumed in cellular phones and portable computers. Total energy required for these devices are small, and relatively few battery cells, up to 8 of the 18650 form factor, are required. Battery life expectation for consumer products is typically 1-2 years. It is relatively easy to design a safe product with only a few battery cells.

However, battery pack for electric vehicles requires a lot of battery cells. A small electric car with 21 KW-hour capacity can have a driving range of 100 Km, and would require 3,000 of the 18650 form factor battery cells, each with 7 watt-hour capacity. By necessity these battery cells must be packaged tightly together with only millimeter spacing, and could generate about 1,000-watt heat load while in operation. Without careful thermal design, battery cell temperature could elevate up to 30 Celsius above ambient, with detrimental effect on battery cell life. Battery system for grid storage and vehicle operation is often 5 years or more, thermal management is a tough design issue for vehicle applications. Furthermore, high energy density battery cells become unstable when internal temperature exceeds 80 degree Celsius. It is cell chemistry and process dependent, and the probability of thermal run away, cell venting, and fire and explosion increases dramatically beyond such safe temperature limit, and the battery pack design must not exceed this limit.

When one battery cell goes into thermal run away, either through violation of safe temperature limit, manufacturing process induced cell short circuit, over charge, or external impact from vehicle crashes, the amount of energy released may cause adjacent battery cells to also go into thermal run away, this chain reaction destroys the battery pack and place the vehicle passengers in great physical danger. Therefore it has been one of major research subjects for the industry to effectively disperse such generated heat and to prevent thermal runaway.

To resolve battery life and safety issues, one common heat dissipation design can be shown in FIG. 1, wherein cooling fins for heat sinking are added to the sides of each battery cell 2 and hence gaps can be created between such battery cells 2 thereby, using forced air convections through air blow generated by the fan 20, it is possible to carry away heat energy from the edges of battery cell 2 and cooling fins.

Battery is typically constructed by rolling a sandwich of anode/separator/cathode in a sheet form into a jelly roll for cylindrical cells with superior thermal conduction in the same direction as the conductive anode/cathode sheets. It is due to the fact that anode/cathode sheets are constructed with metal with good thermal and electrical conductivity. The positive and negative connections are brought out in either the top plane 21 or bottom plane 22 in the same direction as the jelly roll. In a direction perpendicular to the sheets, thermal conduction is significantly worse, because heat must traverse metal, non-conductive separator, metal, non-conductive separator, several times before reaching the outer edge. For prismatic battery cells, it is typically constructed by a flattened version of a jelly roll or an interleaved anode/separator/cathode structure that also exhibit the same characteristics in thermal conduction. For pouch cells, construction is similar to prismatic battery cells except the outer enclosure is a soft pouch.

In other words, even though the distance between the top surface and the bottom surface is greater than the one between the opposite sides, thermal conductivity for the battery cell toward its top face and bottom surface is more efficient than toward the lateral sidewall. A factor of 12 or more in thermal conductance difference between top/bottom surface and sidewall is found in 18650 form factor battery cells. Consequently, prior art cooling fins or forced convection through the sidewall of a battery is hindered by the poor thermal conductivity of the sidewall and not effective in heat removal of the battery cell.

SUMMARY OF THE INVENTION

Accordingly, an objective of the present invention lies in providing a high thermal conductivity battery assembly which allows direct thermal joints between the metal electrode of the battery cell and the metal case thereby facilitating efficient heat dissipation.

Another objective of the present invention is to provide a high thermal conductivity battery assembly that complies with particular mechanical specification by disposing multiple battery cells of standard specification within an enclosure of particular specification.

Yet another objective of the present invention is to provide a high thermal conductivity battery assembly having, within a set of particular mechanical specification, multiple independent battery cells conjunctively installed with fusing devices, thereby removing respective failed battery cell from the circuit upon occurrence of individual battery cell short circuit.

Yet another objective of the present invention is to provide a high thermal conductivity battery assembly having, within a set of particular specification, multiple independent battery cells conjunctively installed with the outer metal enclosure as a barrier and containment for internal battery cell thermal runaway from affecting adjacent battery assemblies.

A high thermal conductivity battery assembly according to the present invention comprises a metal case having a hollow cavity formed therein; a plurality of battery cells, which are installed parallel to each other within the metal case and respectively have two electrodes with one of the corresponding electrodes connected to the aforementioned metal case with low thermal resistance; and a common electrode for connecting in conductivity the other electrode in each of the aforementioned battery cells. The high thermal conductivity connection from the electrodes to the case enables efficient heat dissipation that keeps the battery cells temperature at a low level to prolong battery cell life. In the event of a single battery cell going into thermal runaway, the high thermal conductivity design helps to channel the thermal energy away, reduces the peak temperature of the thermal runaway event, and minimizes the impact to the adjacent battery cells, and lowers the probability of the adjacent cells going into thermal runaway. Furthermore, the enclosure of the battery assembly significantly improves the safety of operation by containing the battery cell thermal runaway event, with one or more vent hole or exhaust valve design to channel away hot gases, and preventing hot gases from directly hitting adjacent battery assembly, and lowering the temperature impinging on adjacent battery assembly to prevent further thermal runaways.

By means of the structure as described above, the multiple battery cells in the high thermal conductivity battery assembly according to the present invention can respectively connect from the electrode to the metal case such that the battery cell is capable of rapidly transferring internally generated heat to the metal case along the axial direction, each of the battery cell is individually installed in connection with a fusing element, in case that any one of the battery cells developed a short circuit, the fusing element will open due to over current, and remove itself from the battery circuit.

The present invention also provides a battery assembly structure with improved metal case, wherein a plurality of notches are formed in the metal case and used as fixation troughs facilitating battery cell placement. Herein the fixation trough may be cut open such that the battery cell installed within the battery assembly can be partially exposed outside of the case. Such a metal case design aims to achieve two goals: it provides a means to secure the battery cells within the assembly; it also provides a smaller battery system footprint than otherwise possible.

Consequently, the present invention can eliminate heat dissipation problems found in prior art through the aforementioned structure. Heat generated by charging and discharging battery cells can be channeled away to the outer enclosure of the battery assembly efficiently, and from there, the heat can be carried away either via convection, forced air, or liquid cooling means. It provides a secondary protection for battery cell thermal runaway. Additionally, battery packing density is improved with this structure.

DETAILED DESCRIPTION OF THE PREFERRED EMBODIMENTS

In the following text, the terms "battery", "cell", and "battery cell" may be used interchangeably and may refer to any of a variety of different cell chemistries and configurations including, but not limited to, cylindrical, prismatic, or pouch designs.

The present invention discloses a high thermal conductivity battery assembly, and the structure of such a high thermal conductivity battery assembly comprises: a hollow metal case; a plurality of battery cells installed in parallel to each other within the above-said metal case, wherein one electrode from each cell are connected to the aforementioned metal case with very low thermal resistance and electrical resistance; and a separate common electrode for connecting the other electrode in each of the aforementioned battery cells.

Figure 1:
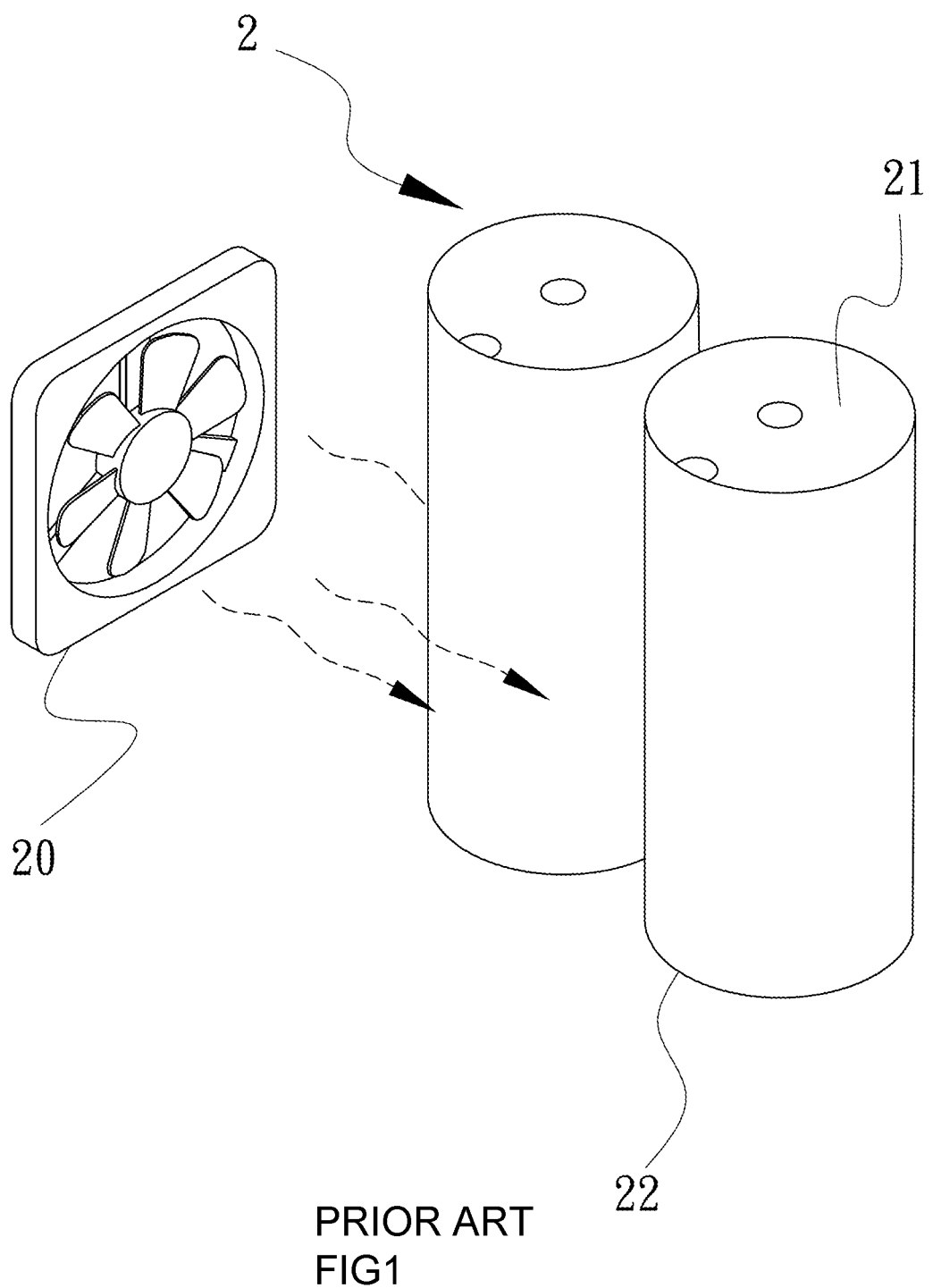
FIG. 1 shows a view for the external case of a prior art battery assembly.
Figure 2:
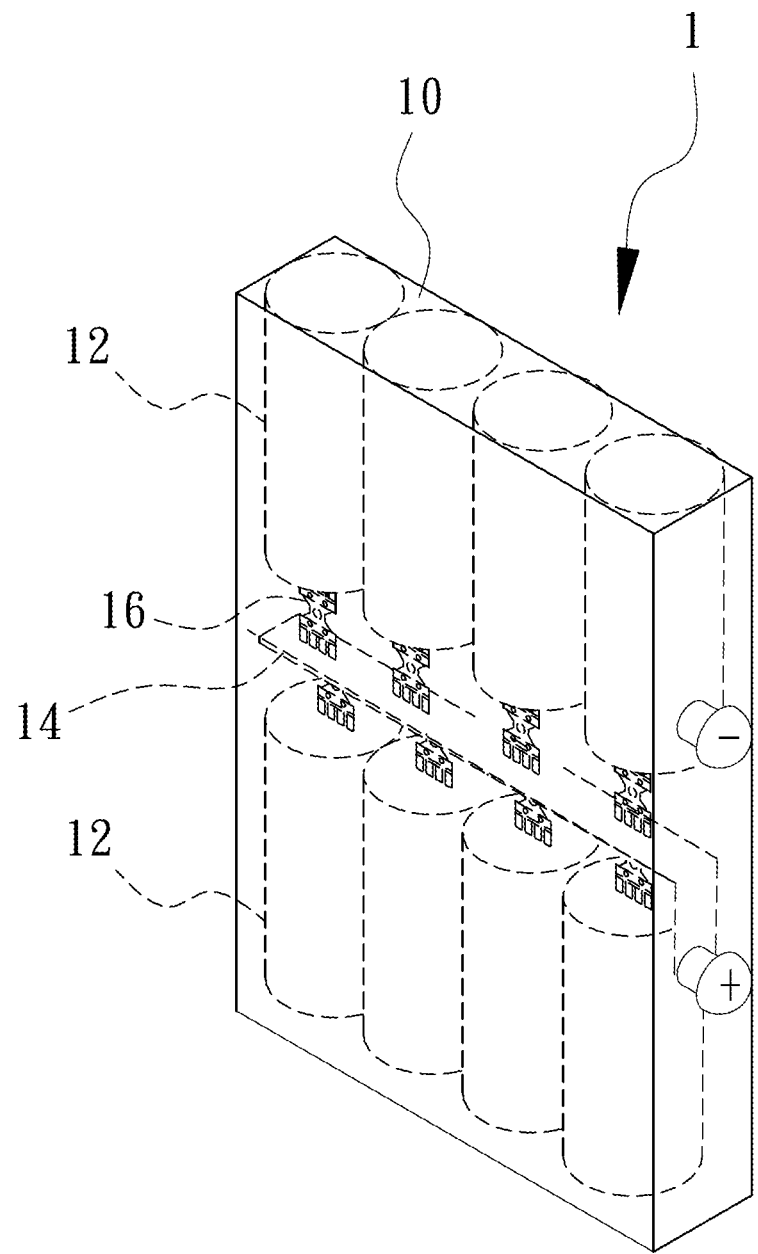
FIG. 2 shows a view for major components of the present invention.

The battery cell is connected to the metal case, in which the electrode contacting the aforementioned metal case is exemplarily a negative electrode in the present embodiment. Such a design allows full exploitation of high thermal conductivity in metal case for battery cooling, but it is still required to make further efforts on structural improvement for achieving good thermal contact to the metal case by the negative electrode terminal of the battery cell. The diagram for such a structure is shown in FIG. 2, wherein the main structure of the high thermal conductivity battery assembly 1 according to the present invention comprises a metal case 10 which accommodates a plurality of battery cells 12 capable of providing electric energy, in which the negative electrode of each battery cell 12 is directly connected to the metal case 10 with good thermal conductivity. There are many ways good thermal conduction contact can be made, by different welding technologies securing electrodes to the sheet metal via metal strips or metal braids. Contrary to the negative electrode, the positive electrode of each battery cell 12 is respectively connected to a common electrode 14 via a set of fuses 16.

Figure 3:
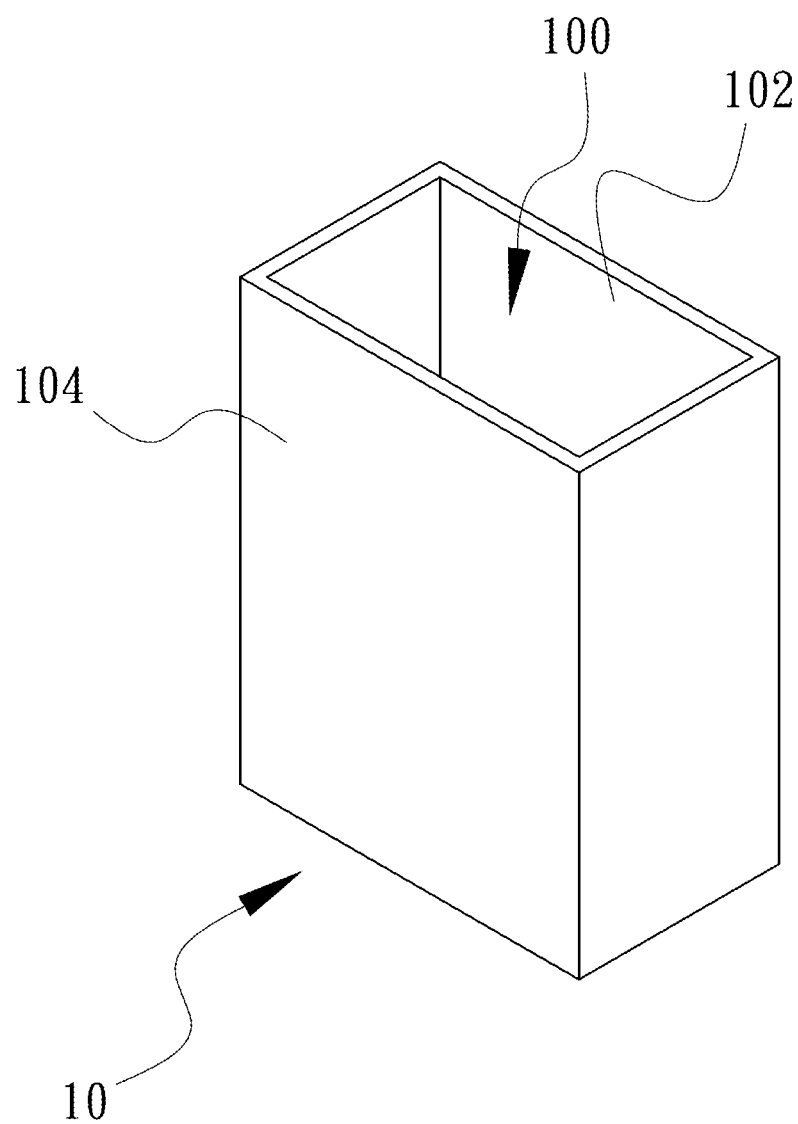
FIG. 3 shows a view for the metal case of the present invention.
Figure 4:
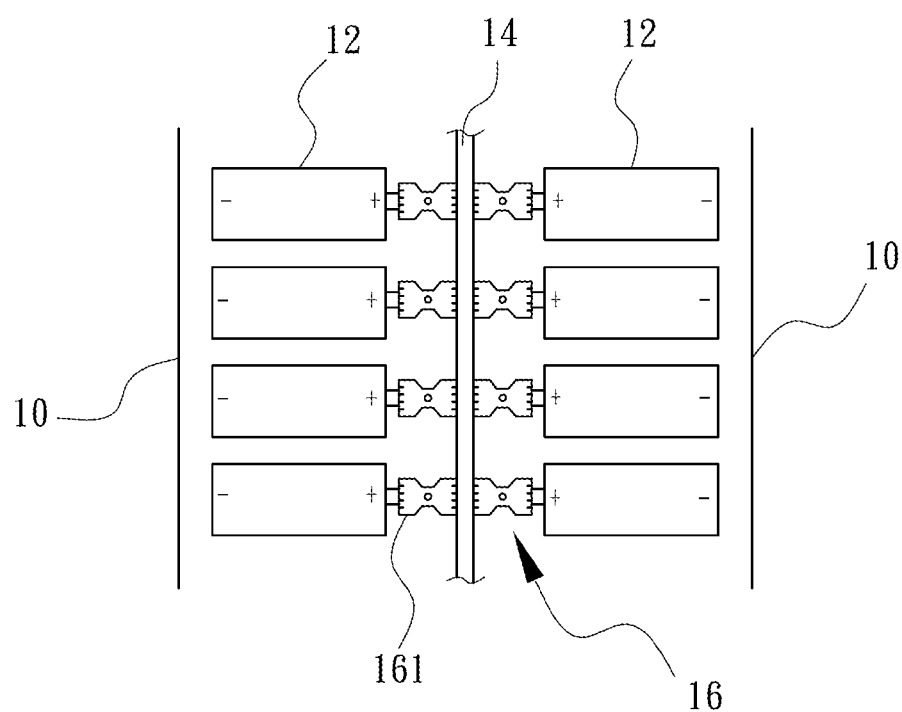
FIG. 4 shows a lateral cross-section view of the present invention.
Figure 5:
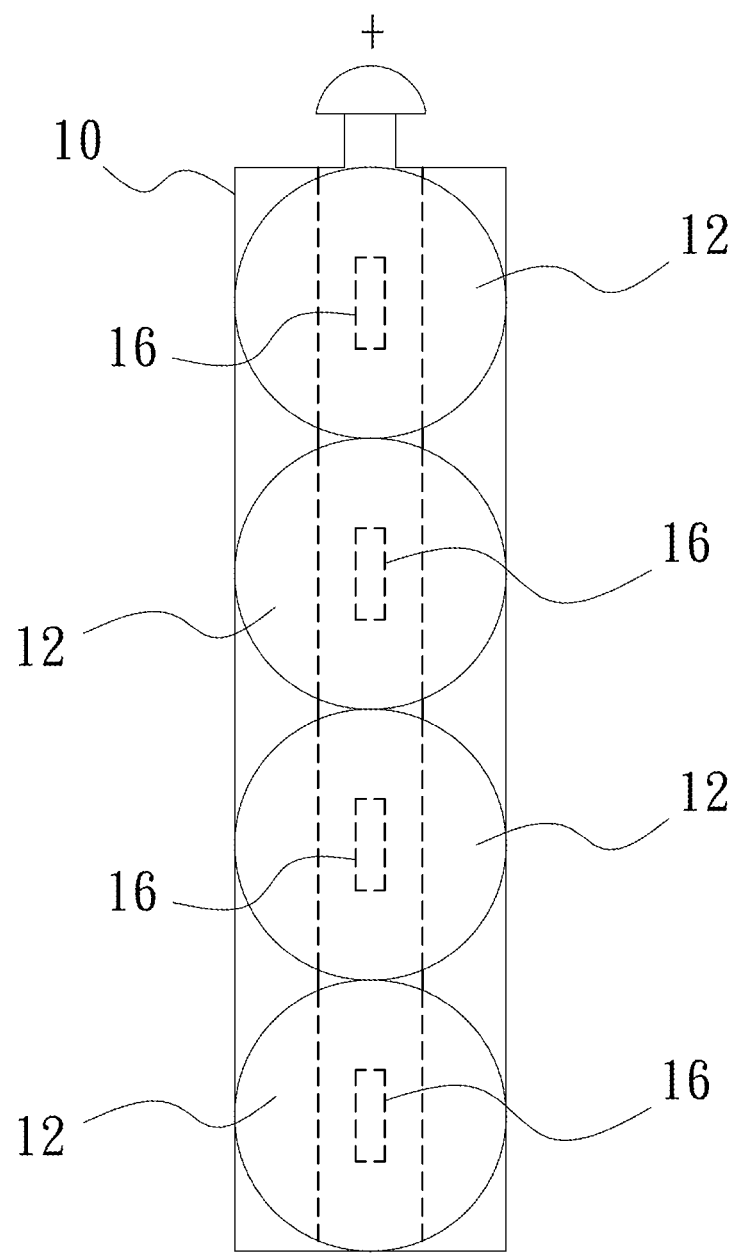
FIG. 5 shows a top perspective view for assisting illustration of FIG. 4.

FIG. 3 shows a stereo perspective view of the metal case 10, wherein the metal case 10 includes an interior side 102 and an exterior side 104 facing oppositely to the aforementioned interior side 102; the central hollow portion acts as a hollow accommodation cavity 100 for placement of the aforementioned plurality of battery cells 12, the common electrode 14 as well as the fusing device 16 attached between them. Next, referring conjunctively to FIGS. 4 and 5, in the present embodiment, the battery cells 12 are arranged in a fashion of left and right rows, with four battery cells 12 allocated in each row and the battery cells 12 in such two left and right rows positioned correspondingly opposite to each other; the negative electrode of each battery cell 12 is directly connected to the metal case 10 such that the metal case 10 acts as common ground thus becoming zero potential or alternatively referred as a common negative electrode.

Since the left and right rows of the battery cells 12 are reversely arranged, positive electrodes of each battery cell are facing toward the center, and each can be connected, via the fusing device 16, to a common electrode 14 and can be brought to the outside of the metal case 10. Said fusing device 16 including a plurality of fuses 161 with each fuse 161 connecting the positive electrode of each battery cell to a common electrode 14; when one of the battery cell 12 is short circuited, excessive electric current will flow through the fuse and cause it to open, removing the damaged battery cell from the circuit and prevent other healthy cells from injecting current to it. Those skilled ones in the art can conveniently appreciate that the fuse device described as above is by no means limited to be installed at the positive terminal of the battery cell, but can be applicably connected at the negative terminal of the circuit. The fusing device can be constructed with discrete fuse, or can be formed by a stamping process where a narrowed strip of metal would serve as fusing element, or can be formed by spot welding a thin wire from the common electrode to the battery cell.

Figure 6:
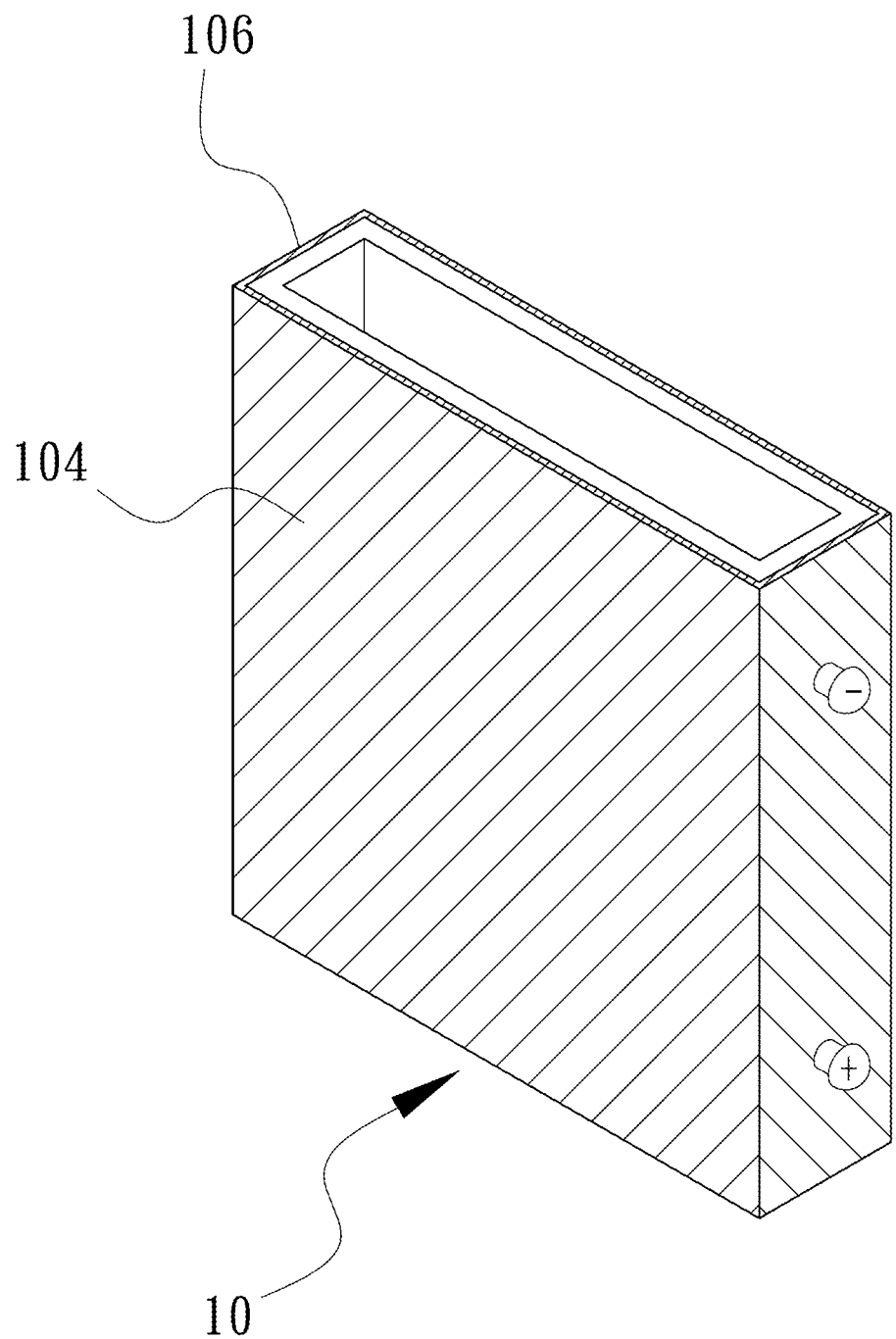
FIG. 6 shows a view for the metal case with an insulating outer surface layer in a second preferred embodiment of the present invention.

FIG. 6 shows a second preferred embodiment according to the present invention, wherein, in order to eliminate safety concerns about possible short circuit between battery assemblies at different electrical potentials, one can form an insulating outer surface layer 106 on the exterior side 104 of the metal case 10 by means of anodizing treatment or spray painting with an insulating material. As an additional measure for safety, said insulating material can have additional flame retarding properties.

Figure 7:
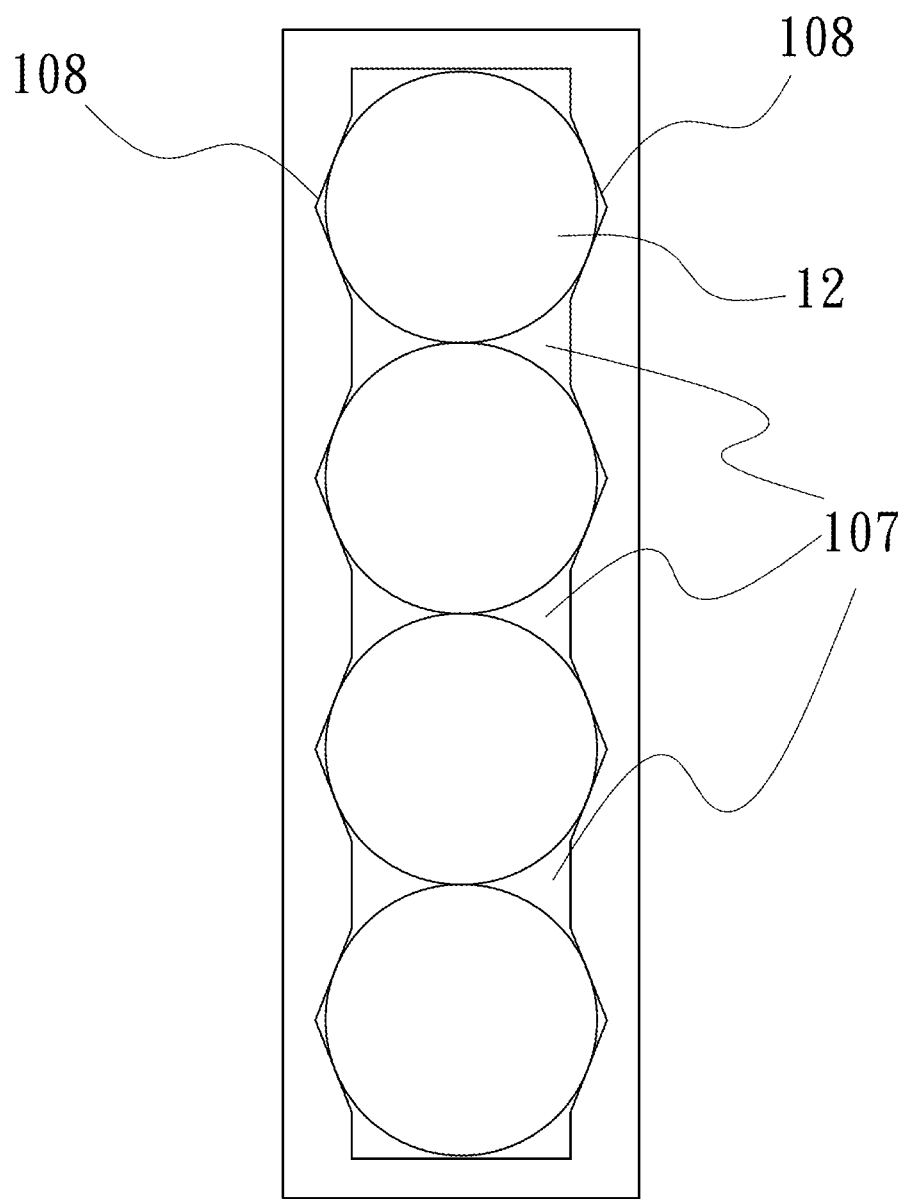
FIG. 7 shows a top view for the metal case with a fixation trough in a third preferred embodiment of the present invention.
Figure 8:
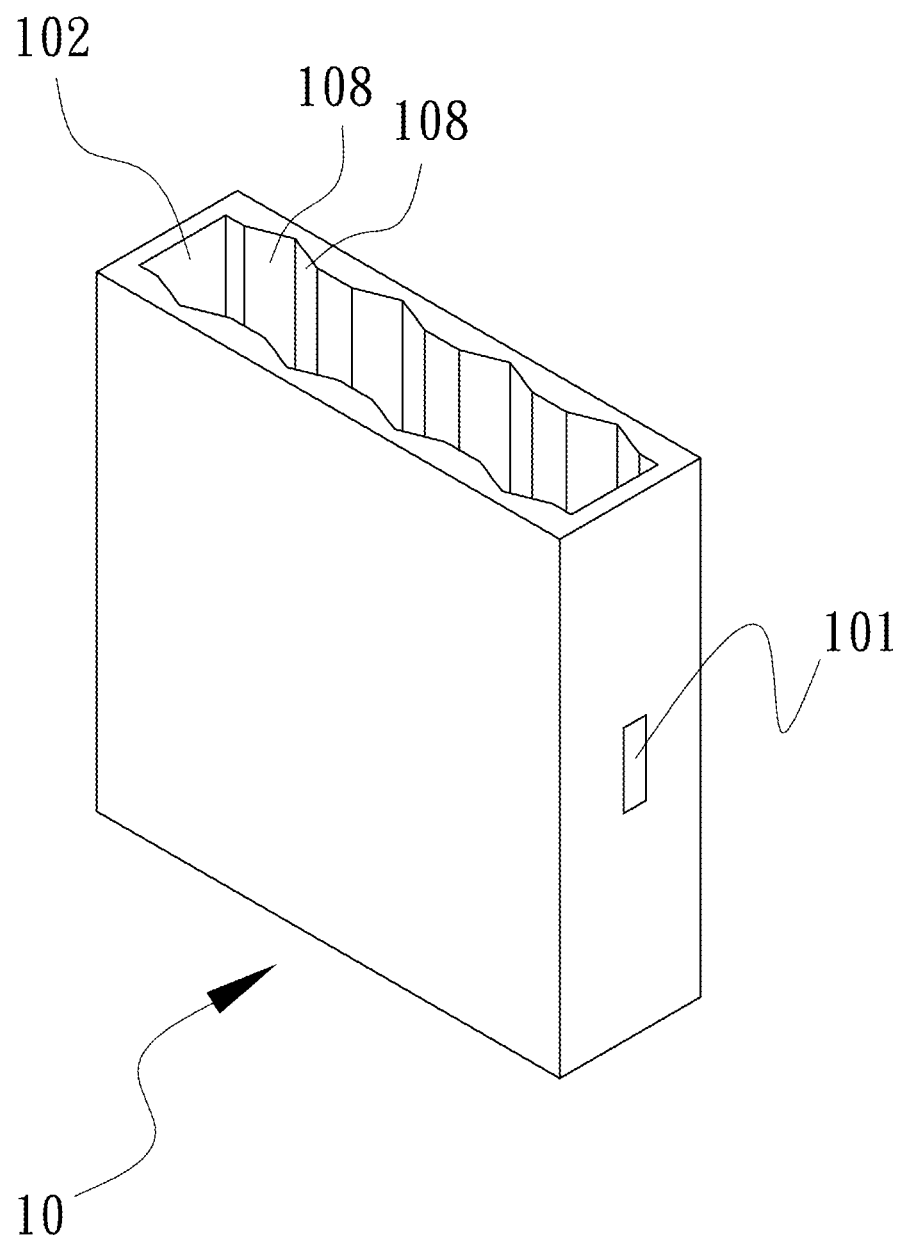
FIG. 8 shows a stereo view for the embodiment in FIG. 7.

Furthermore, in order to meet industry mechanical form factor standard such as DIN SPEC 91252, in a third preferred embodiment of the present invention as shown in FIGS. 7 and 8, the interior side 102 of the metal case 10 is cut in on the internal wall to obtain a number of fixation troughs 108 which are used for both securing the battery cell 12 in position and also reducing the volume of the metal case 10 in order to meet standard form factor specification. In a preferred embodiment, the inside of the metal case 10 may be additionally filled with a phase change material 107, the phase change material can be chosen to have phase change temperature at 40 degrees Celsius. When cell temperature exceeds 40 degrees Celsius, said material will undergo change from solid phase to liquid phase, and in the process absorbs thermal energy to keep cell temperature at a safe temperature with good cell life. The phase change material can also be chosen with phase change temperature at 80 degrees Celsius, to serve as a last line of defense, absorbing thermal energy and prevent battery cells from exceeding safe limit and going into thermal runaway.

In another preferred embodiment, the inside of the metal case 10 may be filled with a flame retardant material 107, said flame retardant can effectively block the thermal energy released from a battery cell under thermal runaway from directly impinge upon the adjacent battery cell, effectively prevent adjacent cells from going into thermal runaway. In another preferred embodiment, the inside of the metal case 10 can be filled with a mixture or slurry of flame retardant material and phase change material.

At least one pressure relief valve 101 may be installed on the metal case thereby allowing release of high pressure, high thermal energy gas generated by battery cell under thermal runaway into a place where it could be channeled away, rather than for the thermal energy to impinge upon neighbor battery assembly and cause its battery cell to go into thermal runaway.

Figure 9:
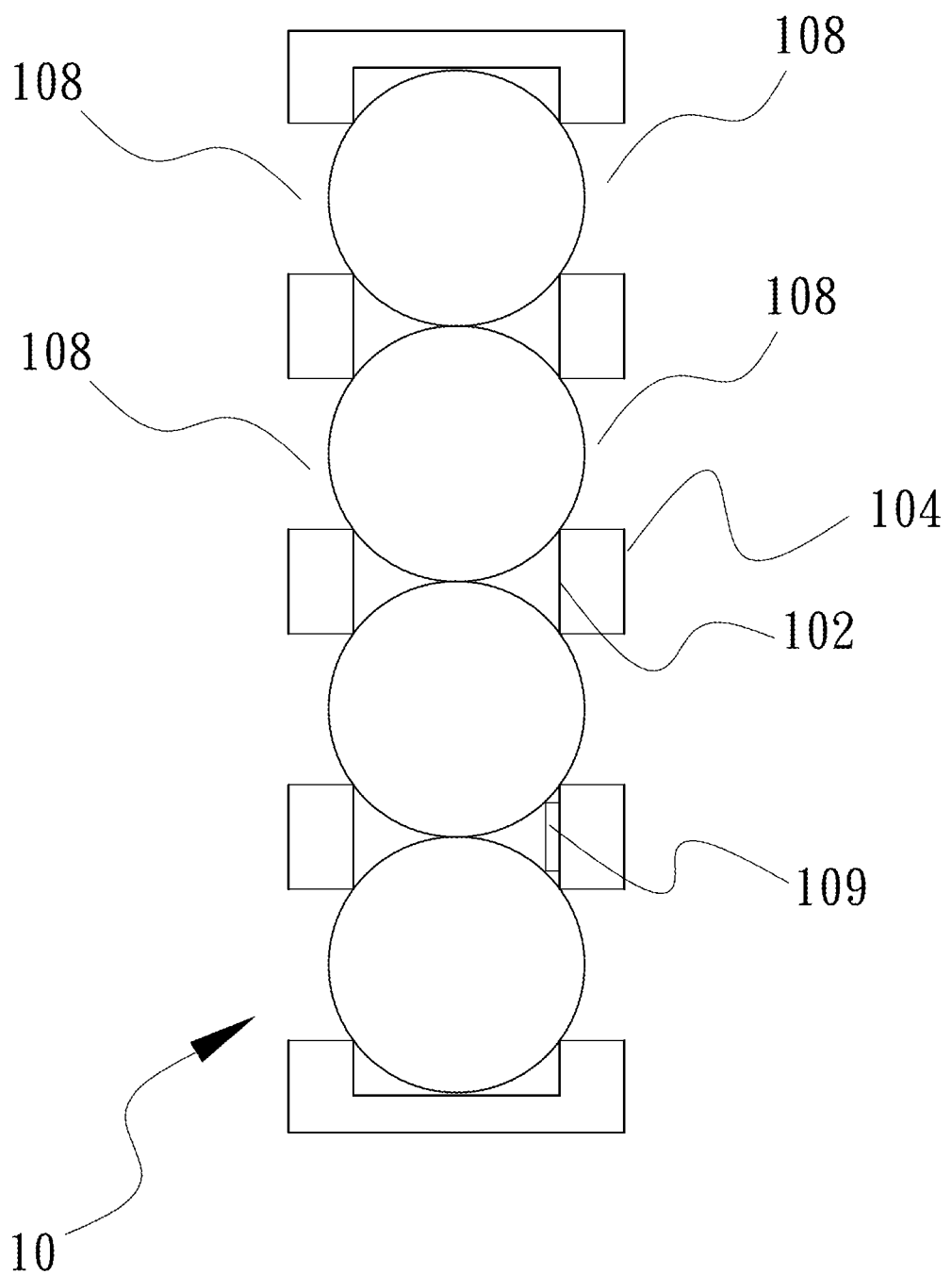
FIG. 9 shows a top view for the metal case with pierced fixation troughs in a fourth preferred embodiment of the present invention.
Figure 10:
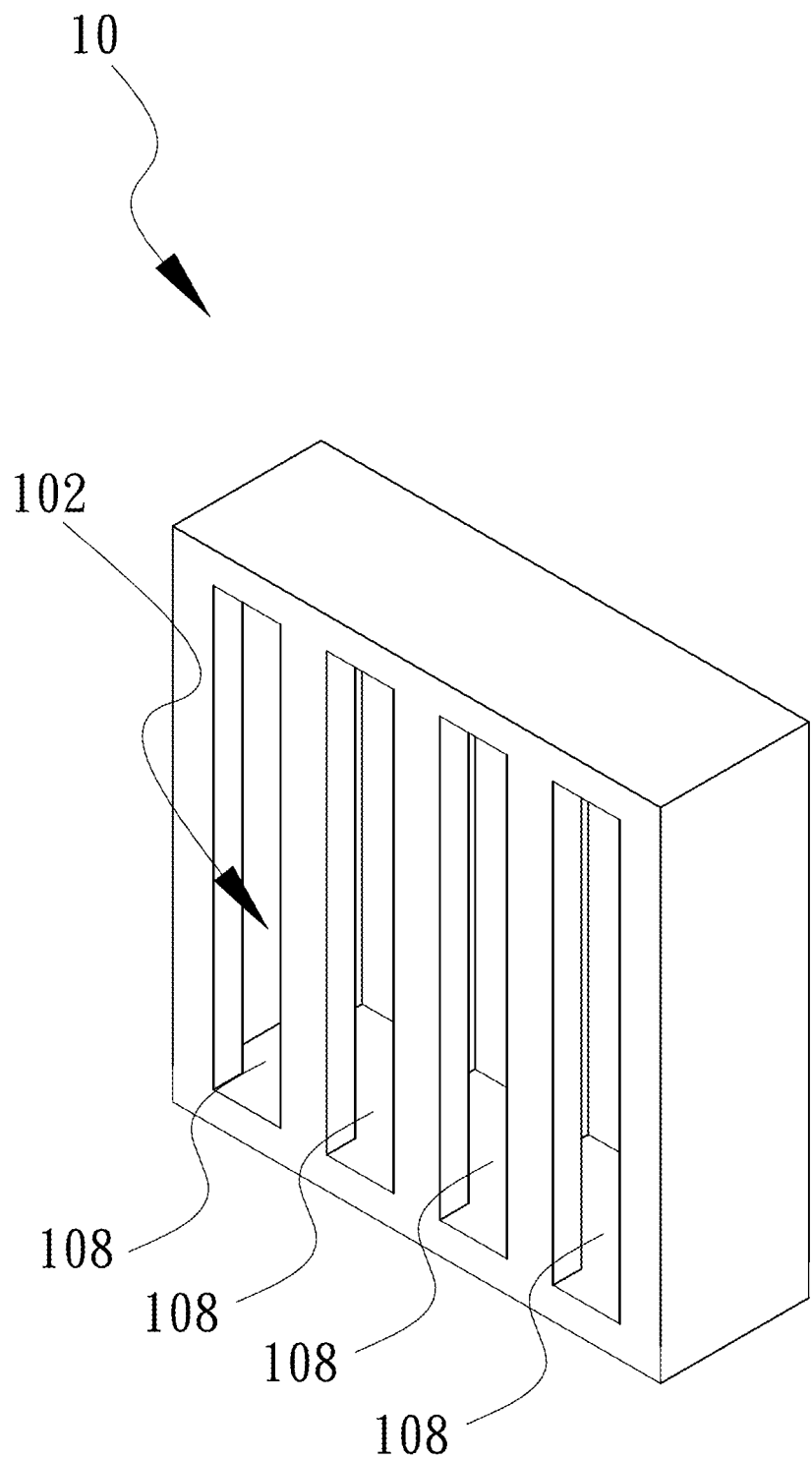
FIG. 10 shows a stereo view for the embodiment in FIG. 9.

Another preferred embodiment of the present invention is shown in FIGS. 9 and 10. It is possible to further deepen the fixation trough 108 such that it penetrates the exterior side 104 outward from the interior side 102 of the metal case 10 thereby forming a fixation trough 108 having four pierced areas. In this way, the essential thickness of the metal case 10 can be minimized and the integral profile thereof is reduced as well. In addition, a temperature sensor 109 can be further installed inside the metal case 10 that enables external monitoring of internal temperature.

Figure 11:
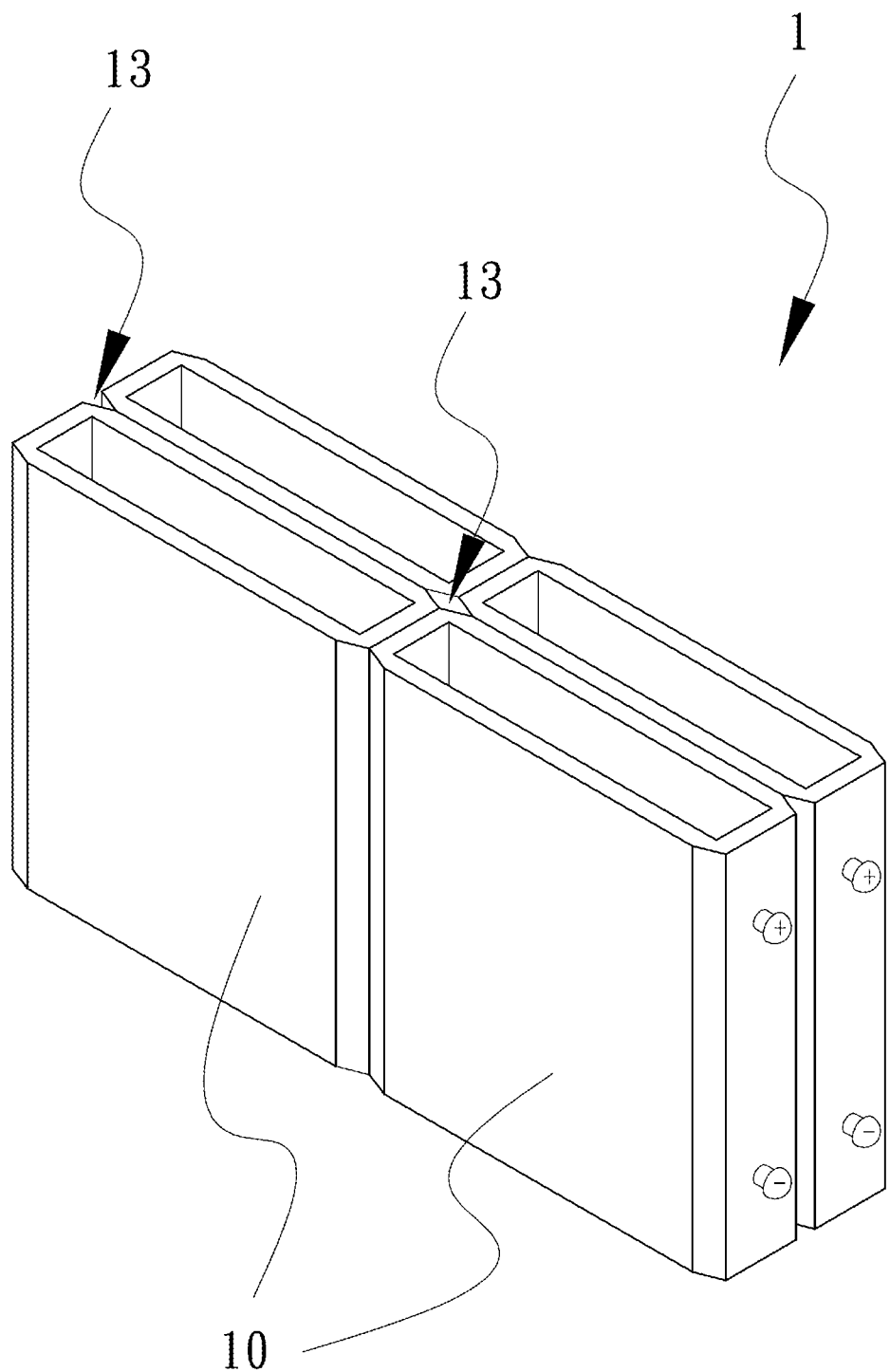
FIG. 11 shows a view for combination of the metal case in a fifth preferred embodiment of the present invention, which illustrates how to form a chamfer edge at the corner of the metal case.

Another preferred embodiment in FIG. 11 shows that the profile of the metal case 10 is substantially of a rectangular structure, and the corners are not right-angled but deliberately chamfered to form an arc-wise chamfer edge 13. As a result, upon combining more than two sets of the high thermal conductivity battery assembly 1, spaces in between the battery assembly can be used for electrical signal conduit or for liquid cooling pipes or for mechanical structural member to be located. The chamfer is not limited to be arc-wise but can be an inclined clip plane as well, which does not restrict the formation of heat dissipation channel or pipeline channel and still ensure the safety of assembly personnel.

Figure 12:
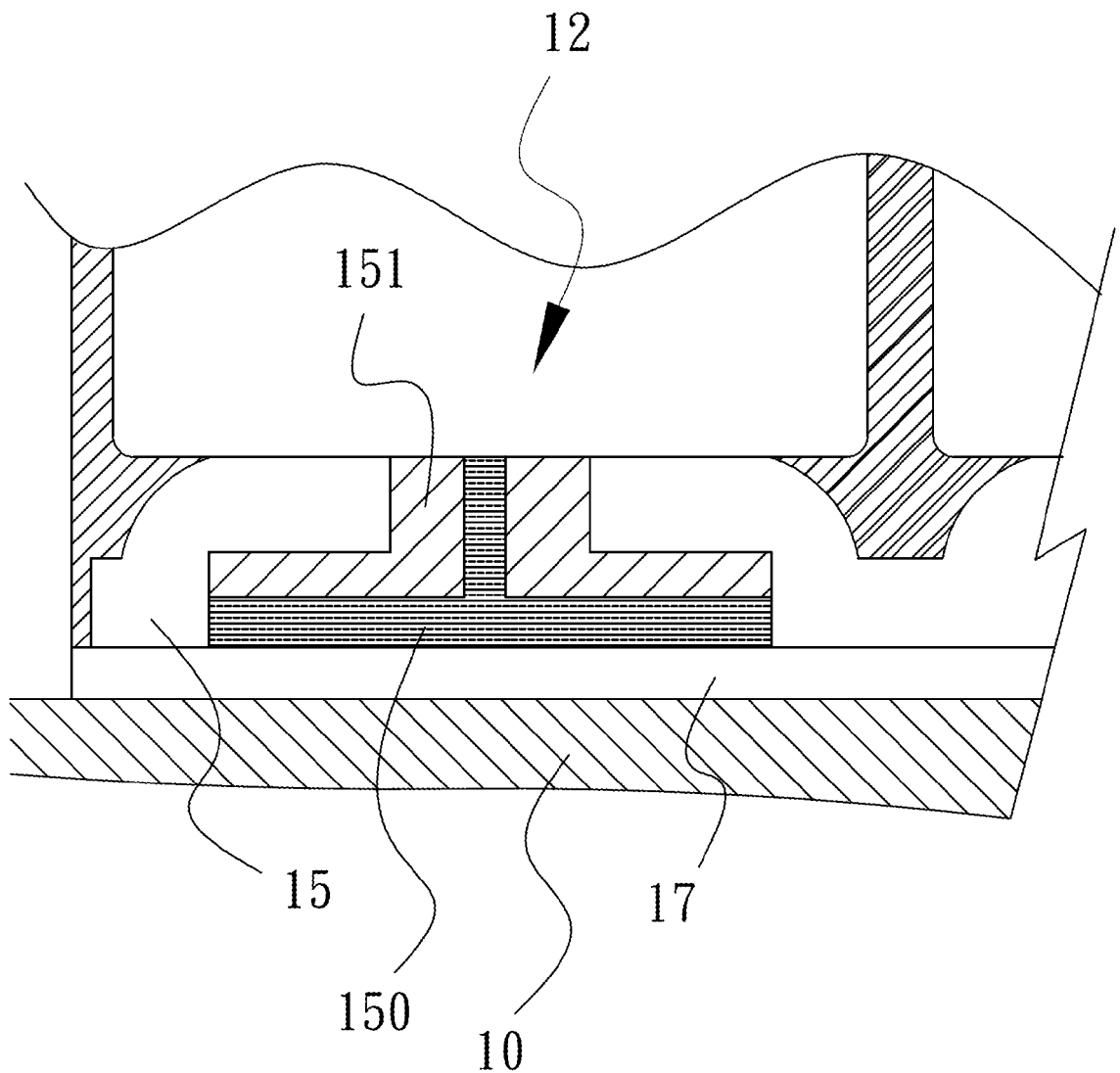
FIG. 12 shows a view for the second common electrode of the embodiment in FIG. 11.

Another preferred embodiment in FIG. 12 shows that a second common electrode 15 can be placed at each battery cell 12 near the metal case 10, but not connect to the metal case 10 directly, wherein a hollow area 151 in between allows for at least one low resistance connection 150 be made between each battery cell 12 electrode and second common electrode 15. Said low resistance connection can be made by resistive welding, ultrasonic welding, or laser welding of thin metal sheet or braids from battery cell 12 electrode to the second common electrode 15. Additionally, a thermal conductive flexible gasket 17 is inserted between the aforementioned second common electrode 15 and the metal case 10. As such, when the subassembly of the battery cell 12 and second common electrode 15 is inserted into the metal case 10, both battery cell 12 and second common electrode 15 are pressure fit to the metal case 15 via the flexible gasket 17, and forms a high thermal conductivity path that allows battery cell 12 internally generated heat to be transferred to the metal case 10 efficiently. Said flexible gasket 17 also serves as a shock absorber for the battery cell 12 under harsh driving conditions.

Figure 13:
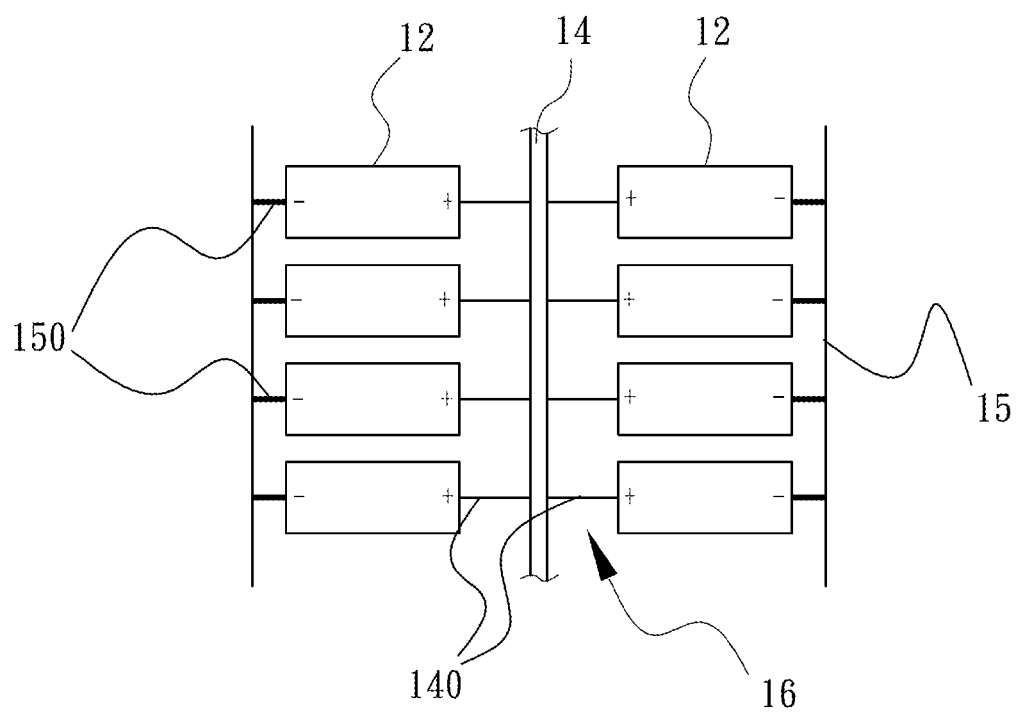
FIG. 13 shows a view for the fuse device of the embodiment in FIG. 11.

Furthermore, as shown in FIG. 13, as compared to the thick conductive wires 150 formed between each battery cell 12 and the common electrode 15 as described above, a thin conductive wire 140 having a smaller diameter is arranged between each battery cell 12 and the common electrode 14, such that the thin conductive wire 14 will be melted down in case the electric current passing through exceeds a predetermined threshold current.

Based on the fact that, in a battery cell, significantly better thermal conductivity exists in the axial direction of electrodes, the present invention allows better heat removal than prior art designs where heat were attempted to be removed from sidewalls.

It should be noticed that, however, the illustrations set forth as above simply describe the preferred embodiments of the present invention which are not to be construed as restrictions for the scope of the present invention; contrarily, all effectively equivalent changes and modifications conveniently made in accordance with the claims and specifications disclosed in the present invention are deemed to be encompassed by the scope of the present invention delineated in the following claims.

What is claimed is:

1. A high thermal conductivity battery assembly, comprising:
    a metal case, having a hollow accommodation cavity formed therein;
    a plurality of battery cells, the plurality of battery cells arranged in a first row of battery cells and a second row of battery cells, the first row and the second row installed parallel to one another within the metal case, each of the battery cells having two electrodes with a first electrode of each of the plurality of battery cells in the first row and the second row being connected in a thermally conductive manner to the metal case; and a common electrode extending along a central portion of the hollow accommodation cavity for connection to a second electrode of each of the battery cells, wherein the second electrode of each of the battery cells of the first row are opposed to a first surface of the common electrode and wherein the second electrode of each of the battery cells of the second row are opposed to a second surface of the common electrode wherein the first electrode of each of the plurality of battery cells in the first row and the second row are connected to a second common electrode and wherein a thermally conductive flexible metal gasket is positioned between the second common electrode and the metal case;

wherein the metal case includes an exterior side facing away from the hollow accommodation cavity and an interior side facing toward the hollow accommodation cavity, and wherein each of the battery cells has an axial direction, and wherein a plurality of fixation troughs are formed on the metal case from the interior side toward the exterior side in a manner extending along the axial directions of the respective battery cells.

2. The battery assembly according to claim 1, wherein the fixation troughs extend across the interior side and the exterior side of the metal case.

3. The battery assembly according to claim 1, further comprising a fuse device installed within the metal case.

4. The battery assembly according to claim 3, wherein the respective battery cells are connected at their negative poles to the metal case in a thermally conductive manner, with their positive poles being connected to the common electrode, and wherein the fuse device comprises a plurality of fuse wires, each being installed between the common electrode and a different one of the positive poles of the battery cells so that each of the battery cells has a dedicated fuse.

5. The battery assembly according to claim 1, further comprising at least one exhaust valve installed on the metal case.

6. The battery assembly according to claim 1, wherein the metal case includes an insulating outer surface layer.

7. The battery assembly according to claim 1, further comprising a phase change material filled within the hollow accommodation cavity, and the phase change material has a phase change temperature below a predetermined safety threshold.

8. The battery assembly according to claim 1, further comprising a flame retardant material filled within the hollow accommodation cavity.

9. The battery assembly according to claim 1, further comprising at least one temperature sensor installed within the hollow accommodation cavity.

10. The battery assembly according to claim 1, wherein the metal case is cuboid-shaped and chamfered at corners thereof.

11. The battery assembly according to claim 1, wherein the first row of battery cells and the second row of battery cells are coplanar.

12. The battery assembly according to claim 1, wherein the second electrode of each of the battery cells of the first row faces the second electrode of a corresponding one of the battery cells of the second row.

13. The battery assembly according to claim 1, wherein the second electrode of each of the battery cells of the first row is proximate to the common electrode, the second electrode of each of the battery cells of the second row is proximate to the common electrode, the first electrode of each of the battery cells in the first row is distal to the common electrode, and the first electrode of each of the battery cells in the second row is distal to the common electrode.

14. The battery assembly according to claim 1, wherein the first electrode of each of the plurality of battery cells in the first row and the second row are connected to the metal case by at least one metal braid.

15. The battery assembly according to claim 1, wherein the first electrode of each of the plurality of battery cells in the first row and the second row are connected to the metal case by welding.

16. The battery assembly according to claim 1, further comprising:

the second electrode of each of the battery cells coupled to the common electrode by a fuse individual to the battery cell, such that the battery cell is disconnected from the common electrode when the fuse individual to the battery cell opens.

17. The battery assembly according to claim 1, further comprising:

a mixture of flame retardant material and phase change material inside the metal case.

* * * * *